United States Patent
Gao et al.

(10) Patent No.: US 12,359,539 B2
(45) Date of Patent: Jul. 15, 2025

(54) CARBON DIOXIDE ENHANCED HYDROCARBON RECOVERY METHODS COUPLED WITH UNDERGROUND HYDROGEN STORAGE

(71) Applicant: SAUDI ARABIAN OIL COMPANY, Dhahran (SA)

(72) Inventors: Jun Gao, Dhahran (SA); Hyung T. Kwak, Dhahran (SA); Abdulaziz S. Al-Qasim, Dhahran (SA); Ali Alyousef, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 21 days.

(21) Appl. No.: 18/355,304

(22) Filed: Jul. 19, 2023

(65) Prior Publication Data
US 2025/0027386 A1    Jan. 23, 2025

(51) Int. Cl.
*E21B 41/00* (2006.01)
*E21B 43/16* (2006.01)

(52) U.S. Cl.
CPC ........ *E21B 41/0064* (2013.01); *E21B 43/168* (2013.01)

(58) Field of Classification Search
CPC .... E21B 41/0064; E21B 43/168; E21B 43/16; C25B 1/04
See application file for complete search history.

(56) References Cited

U.S. PATENT DOCUMENTS

| | | |
|---|---|---|
| 5,778,977 A | 7/1998 | Bowzer et al. |
| 2013/0043163 A1* | 2/2013 | Keith ............... G06Q 50/00 166/402 |

(Continued)

OTHER PUBLICATIONS

Bao, X., Fragoso, A., & Aguilera, R. (2023). Simultaneous enhanced oil recovery, CCUS and Uhus in shale oil reservoirs. International Journal of Coal Geology, 275, 104301. https://doi.org/10.1016/j.coal.2023.104301 (Year: 2023).*

(Continued)

*Primary Examiner* — Tara Schimpf
*Assistant Examiner* — Daniel T Craig
(74) *Attorney, Agent, or Firm* — Vorys, Sater, Seymour and Pease LLP

(57) ABSTRACT

Hydrocarbon extraction may be coupled with subterranean hydrogen storage. For example, a method of hydrocarbon extraction and hydrogen storage may include: introducing carbon dioxide into a subterranean formation via one or more injection wells, the subterranean formation containing hydrocarbons and optionally water; mobilizing at least a portion of the hydrocarbons in a hydrocarbon-bearing zone of the subterranean formation with the carbon dioxide; after mobilization with the carbon dioxide, producing the hydrocarbons from the hydrocarbon-bearing zone of the subterranean formation via one or more production wells; introducing hydrogen to the subterranean formation via the one or more injection wells, the hydrogen displacing the carbon dioxide downward in the subterranean formation; storing the hydrogen in the subterranean formation above the carbon dioxide; and producing at least a portion of the hydrogen from the subterranean formation via the one or more production wells, the one or more injection wells, or any combination thereof.

19 Claims, 4 Drawing Sheets

(56) References Cited

U.S. PATENT DOCUMENTS

2022/0268129 A1    8/2022  Dockter
2023/0016334 A1*  1/2023  Chorn .................. E21B 43/305

OTHER PUBLICATIONS

Dumore, J. M. "Stability considerations in downward miscible displacements." Society of Petroleum Engineers Journal 4.04 (1964): 356-362.
Tan, Yewen, Mark A. Douglas, and Kelly V. Thambimuthu. "CO2 capture using oxygen enhanced combustion strategies for natural gas power plants." Fuel 81.8 (2002): 1007-1016.
Hagoort, Jo. "Oil recovery by gravity drainage." Society of Petroleum Engineers Journal 20.03 (1980): 139-150.
Azin, R. E. Z. A., A. M. I. R. Nasiri, and Jodeyri Entezari. "Underground gas storage in a partially depleted gas reservoir." Oil & Gas Science and Technology-Revue de l'IFP 63.6 (2008): 691-703.
He et al., "An analytical method for evaluating the underground hydrogen storage capacity in depleted gas reservoirs using CO2 as cushion gas", Energy Proceedings—CCUS Technologies for the Carbon Neutrality: Part II, 2023, 8 pages, vol. 34. doi: 10.46855/energy-proceedings-10599.
Oldenburg, "Carbon Sequestration in Natural Gas Reservoirs: Enhanced Gas Recovery and Natural Gas Storage", Tough Symposium, 2003.

\* cited by examiner

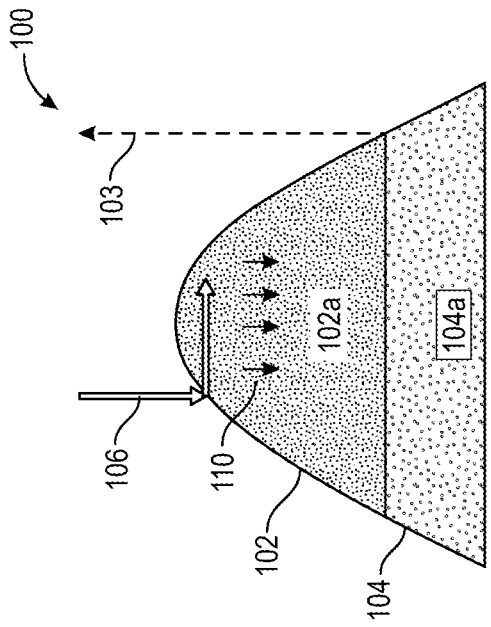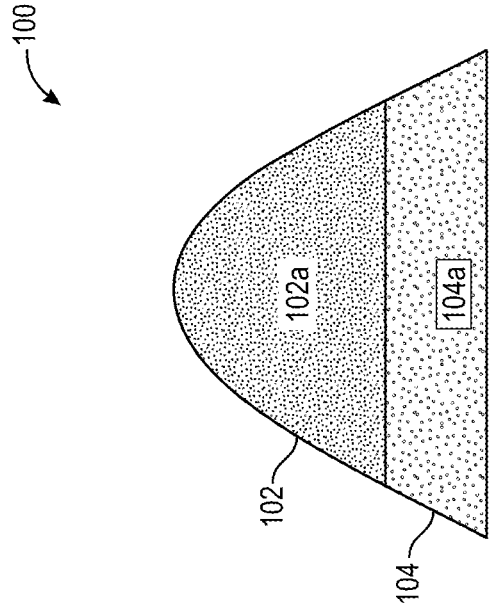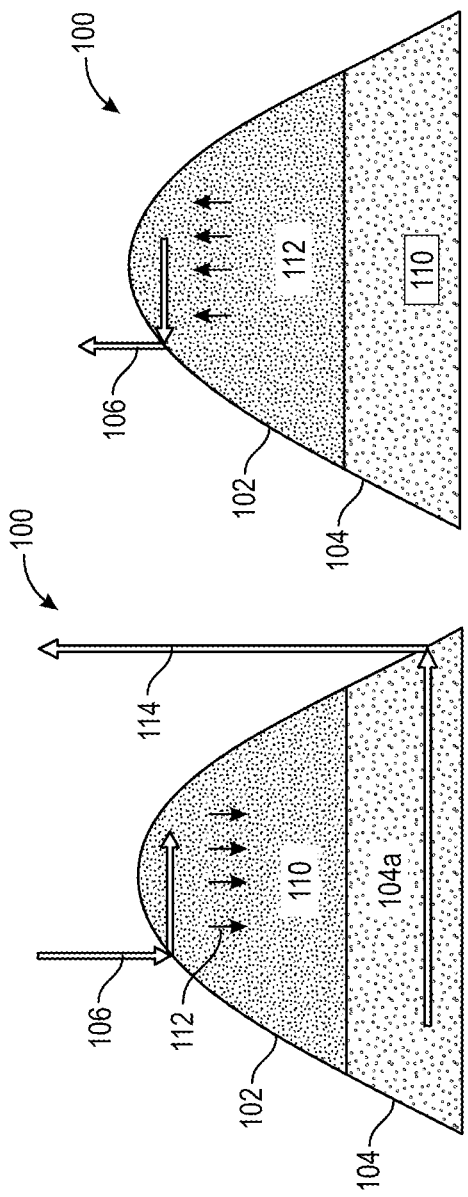

CARBON DIOXIDE ENHANCED HYDROCARBON RECOVERY METHODS COUPLED WITH UNDERGROUND HYDROGEN STORAGE

FIELD OF THE DISCLOSURE

The present disclosure relates generally to methods and systems for enhanced hydrocarbon recovery and, more particularly, enhanced hydrocarbon recovery methods and systems utilizing carbon dioxide.

BACKGROUND OF THE DISCLOSURE

Enhanced hydrocarbon recovery (e.g., enhanced oil recovery, EOR) refers to methods and systems that inject fluids through an injection well to a downhole location to encourage release of the hydrocarbons within a subterranean formation and mobilization of the hydrocarbons toward a production well. The injected fluids may promote release and mobilization of hydrocarbons through a variety of mechanisms including oil swelling, viscosity reduction, and wettability alteration, for example.

One particularly attractive enhanced hydrocarbon recovery technique is carbon dioxide injection. Carbon dioxide may promote release and mobilization of hydrocarbons within a subterranean formation to improve production by reducing the hydrocarbon viscosity and pushing the hydrocarbons toward a production well. Carbon dioxide for injection may be sourced in a cost-effective manner in comparison to alternative gases and injection fluids. Moreover, downhole injection of carbon dioxide also offers a potential avenue for underground sequestration of this greenhouse gas.

One technique that may utilize carbon dioxide in advanced hydrocarbon recovery is gas-assisted gravity drainage (GAGD). GAGD introduces a gas (e.g., carbon dioxide) above a hydrocarbon-bearing zone in a subterranean formation, such that the gas percolates downward in the course of increasing the extent of contact between the gas and subterranean hydrocarbons to facilitate production thereof.

Carbon dioxide for enhanced hydrocarbon recovery may be sourced from a combustion process, such as carbon capture utilization and storage (CCUS) during a combustion process. One method of CCUS may include carbon capture during oxy-fuel combustion of a hydrocarbon. Oxy-fuel combustion allows for burning of a hydrocarbon with nearly pure oxygen to generate a flue gas that primarily includes carbon dioxide suitable for CCUS. Although it is environmentally desirable to sequester captured carbon dioxide, such as within a subterranean formation, there is little economic benefit of doing so at present unless hydrocarbons are concurrently released as a consequence of the carbon dioxide introduction.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

A first nonlimiting method of the present disclosure includes: introducing carbon dioxide into a subterranean formation via one or more injection wells, the subterranean formation containing hydrocarbons and optionally water; mobilizing at least a portion of the hydrocarbons in a hydrocarbon-bearing zone of the subterranean formation with the carbon dioxide; after mobilization with the carbon dioxide, producing the hydrocarbons from the hydrocarbon-bearing zone of the subterranean formation via one or more production wells; introducing hydrogen to the subterranean formation via the one or more injection wells, the hydrogen displacing the carbon dioxide downward in the subterranean formation; storing the hydrogen in the subterranean formation above the carbon dioxide; and producing at least a portion of the hydrogen from the subterranean formation via the one or more production wells, the one or more injection wells, or any combination thereof.

A second nonlimiting method of the present disclosure includes: introducing carbon dioxide gas into a subterranean formation via one or more injection wells, the carbon dioxide gas being obtained via carbon capture from an oxy-fuel combustion of a supplied hydrocarbon and a supplied oxygen, and the subterranean formation containing hydrocarbons and optionally water; mobilizing at least a portion of the hydrocarbons in a hydrocarbon-bearing zone of the subterranean formation with the carbon dioxide gas; after mobilization with the carbon dioxide gas, producing the hydrocarbons from the hydrocarbon-bearing zone of the subterranean formation via one or more production wells; introducing hydrogen gas into the subterranean formation via the one or more injection wells, the hydrogen gas displacing the carbon dioxide gas downward in the subterranean formation; storing the hydrogen gas in the subterranean formation above the carbon dioxide gas; and producing at least a portion of the hydrogen gas from the subterranean formation via the one or more production wells, the one or more injection wells, or any combination thereof.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIG. 1A-D are diagrams showing sequential progression of how carbon dioxide may be used in enhanced hydrocarbon recovery followed by downhole storage of hydrogen according to the disclosure herein.

DETAILED DESCRIPTION

Figure 2A:
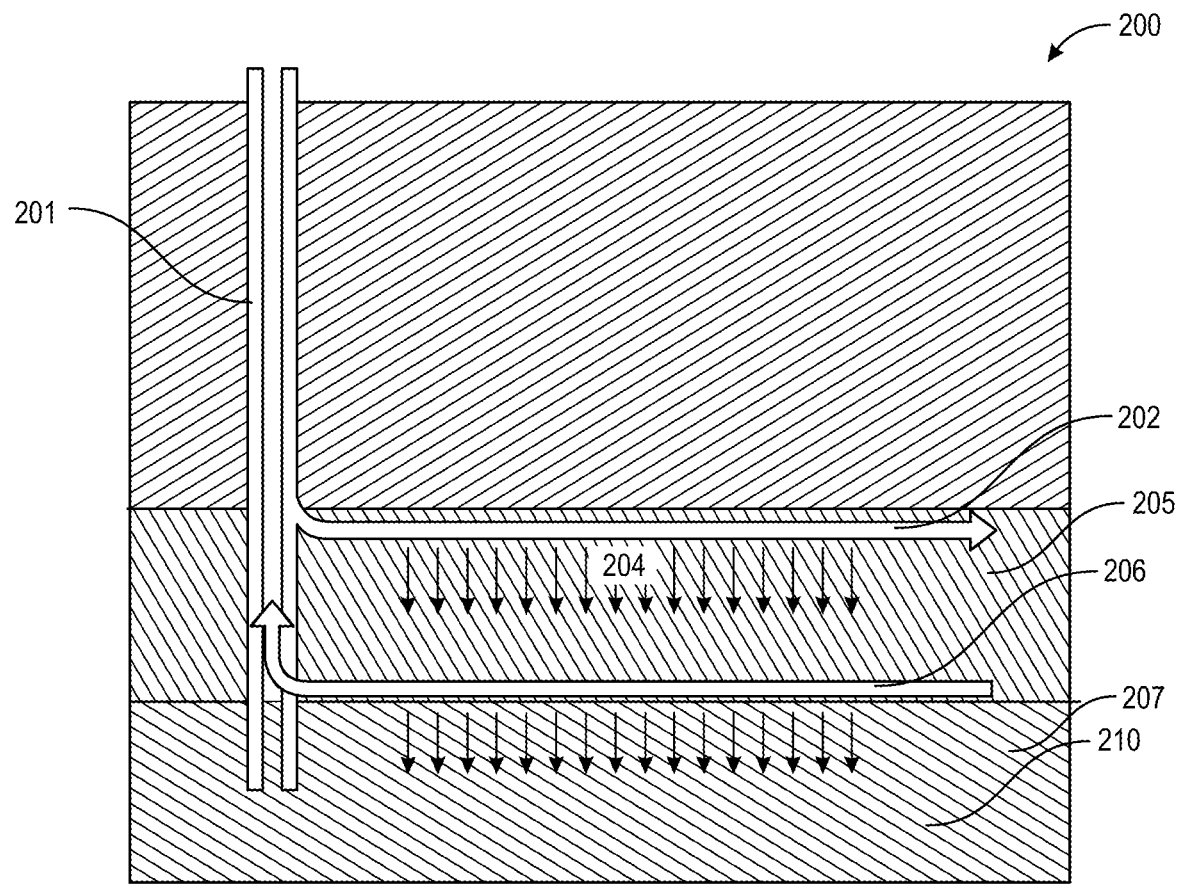
FIGS. 2A and 2B show how one or more wells may introduce carbon dioxide and hydrogen to a subterranean formation in conjunction with enhanced hydrocarbon recovery and subsequent hydrogen storage according to the disclosure herein.

The present disclosure relates generally to methods and systems for enhanced hydrocarbon recovery and, more particularly, enhanced hydrocarbon recovery methods and systems utilizing carbon dioxide.

As discussed above, there is increasing interest in systems and methods for introduction of carbon dioxide to a subterranean formation during enhanced hydrocarbon recovery. Gas-assisted gravity drainage (GAGD) is one such technique that may utilize carbon dioxide for promoting enhanced hydrocarbon recovery. In many instances, drilling a series of wells for GAGD may be expensive, and utilization of the wells may be limited once reservoir depletion has occurred.

The present disclosure provides integrated methods for producing hydrocarbons from a subterranean formation using carbon dioxide-based GAGD during advanced hydrocarbon recovery, followed by introduction and storage of hydrogen in the subterranean formation. Integration of these processes may include generation of hydrogen and electrical power in an environmentally friendly manner as part of a loop cycle in which the carbon dioxide sequestration, hydrocarbon production, hydrogen storage and production, and electricity generation work together synergistically. After using the carbon dioxide to promote mobilization and production of hydrocarbons from a hydrocarbon-bearing zone of the subterranean formation, the hydrogen may be introduced through the same injection wells and undergo subsequent production therefrom at a later time. Alternately, one or more separate production wells may be utilized for producing the hydrogen at a desired time. The previously introduced carbon dioxide may serve as a cushion gas when introducing the hydrogen to the subterranean formation, which may aid in maintaining reservoir pressure and facilitating production of the hydrogen when desired. Advantageously, the methods of the present disclosure allow the carbon dioxide to remain sequestered in the subterranean formation after promoting mobilization and production of reservoir hydrocarbons, and the carbon dioxide may remain sequestered after introducing, storing, and producing the hydrogen. Further advantageously, hydrogen introduction using one or more existing injection wells and subsequent storage thereof may afford better utilization of the large capital expenditures borne during drilling, thereby extending the expenditure lifetime as a subterranean formation is transitioned from hydrocarbon production to extended carbon dioxide storage and transient hydrogen storage after reservoir depletion has occurred.

The hydrogen stored in the subterranean formation may afford a number of advantages. Hydrogen is a fuel source capable of being renewably generated in an environmentally friendly manner. Stored hydrogen may be produced and used as a clean energy source for electrical energy production and vehicle propulsion, among other applications. Hydrogen storage according to the present disclosure may offer the potential for storage of large volumes of hydrogen to facilitate high-volume applications. Additional benefits may be realized as well, as discussed further herein.

Thus, the present disclosure may facilitate sequestration of carbon dioxide to decrease greenhouse gas emissions while also promoting increased hydrocarbon production, facilitating storage of hydrogen as a renewable energy source, generation of clean energy utilizing the stored hydrogen, and affording ready capture of carbon dioxide, such as during oxy-gas combustion. By performing the foregoing as part of a loop cycle, increased environmental favorability may be realized by keeping greenhouse gas emissions as low as possible. Additional details in this regard are provided hereinbelow.

Accordingly, methods of the present disclosure may comprise: introducing carbon dioxide into a subterranean formation via one or more injection wells, the subterranean formation containing hydrocarbons and optionally water; mobilizing at least a portion of the hydrocarbons in a hydrocarbon-bearing zone of the subterranean formation with the carbon dioxide; after mobilization of the carbon dioxide, producing the hydrocarbons from the hydrocarbon-bearing zone of the subterranean formation via one or more production wells; introducing hydrogen to the subterranean formation via the one or more injection wells, the hydrogen displacing the carbon dioxide downward in the subterranean formation; storing the hydrogen in the subterranean formation above the carbon dioxide; and producing at least a portion of the hydrogen from the subterranean formation via the one or more production wells, the one or more injection wells, or any combination thereof.

Embodiments of the present disclosure are described in more detail hereinafter with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

FIG. 1A-1D are diagrams showing sequential progression of how carbon dioxide may be used in enhanced hydrocarbon recovery followed by downhole storage of hydrogen according to the disclosure herein. FIG. 1A illustrates subterranean formation 100 having oil 102a and water 104a within hydrocarbon-bearing zone 102 and water-bearing zone 104, respectively. In FIG. 1B, carbon dioxide 110 is introduced to subterranean formation 100 via injection well 106. As carbon dioxide 110 moves downward through hydrocarbon-bearing zone 102, oil 102a undergoes mobilization and is produced via production well 103. Optionally, oil 102a may be produced as an oil/water mixture. In FIG. 1C, hydrogen 112 is introduced via injection well 106 and displaces previously introduced carbon dioxide 110 downward into water-bearing zone 104 (or the remainder of previously introduced carbon dioxide 110 if carbon dioxide 110 at least partially entered into water-bearing zone 104). As carbon dioxide 110 enters water-bearing zone 104, water 104a is displaced therefrom and produced via production well 114. FIG. 1D illustrates subterranean formation having hydrogen 112 and carbon dioxide 110 present therein, wherein carbon dioxide 110 is located below hydrogen 112. As needed, at least a portion of hydrogen 112 may be produced from subterranean formation 100 via injection well 106 (or a different injection well or production well), or additional hydrogen 112 may be introduced thereto. Carbon dioxide 110 may remain sequestered within subterranean formation 100 while storing and producing hydrogen 112 and/or while introducing additional hydrogen 112.

Methods of the present disclosure include those in which carbon dioxide is introduced to a subterranean formation in order to promote at least partial mobilization and production of hydrocarbons from a hydrocarbon-bearing zone. The carbon dioxide introduction may be conducted in conjunction with an enhanced hydrocarbon recovery process. The carbon dioxide introduced may be of any suitable purity, including a purity lower than conventional enhanced hydrocarbon recovery using carbon dioxide. A suitable purity for the carbon dioxide may be from 50 wt % to 99.9999 wt %, or from 75 wt % to 99.9999 wt %, or from 90 wt % to 99.9999 wt %, or greater than 75 wt %, or greater than 90 wt %, or greater than 95 wt %. The carbon dioxide may be blended with additional gases including, but not limited to, nitrogen, air, flue gas, the like, or any combination thereof. In some embodiments, the carbon dioxide may be, at least partially, provided as part of a flue gas stream. The injection rate and the interface area of the carbon dioxide with the subterranean formation may both be of any suitable range. Preferably, the injection rate and the interface area does not exceed a gravity-stable velocity in order to maintain high sweep efficiency of the hydrocarbons being produced. One suitable method for calculating gravity-stable velocity may be from J. M. Dunmore, *Stability Considerations in Downward Miscible Displacements* (1964), as shown in Equation 1:

$$u_{st} = 2.741 \frac{k\sin(\theta)}{\phi}\left(\frac{\partial \rho}{\partial \mu}\right)_{min} \quad \text{Equation 1}$$

where $u_{st}$ is the gravity-stable velocity ($cm^3$ fluid/$cm^2$ cross sectional area), k is the permeability constant (darcys), $\phi$ is the porosity, $\theta$ is reservoir dip angle, and $(\partial \rho/\partial \mu)$ min is the minimum of $(\partial \rho/\partial \mu)$, where $\rho$ is density ($g/cm^3$), and $\mu$ is absolute viscosity (g/cm-sec).

As discussed above, the gravity-stable velocity of introduction of the carbon dioxide may affect the sweep efficiency. "Sweep efficiency," as used herein, is a measure of the effectiveness of an injection process to promote hydrocarbon recovery. Sweep efficiency may additionally depend on factors including, but not limited to, a volume of the reservoir being contacted by the injected fluid, an injection pattern, off-pattern wells, fractures in the formation, reservoir thickness, permeability and areal and vertical heterogeneity, mobility ratio, density difference between the injected fluid (e.g., carbon dioxide) and the displaced fluid (e.g., the hydrocarbons to be produced), the like, or any combination thereof. In non-limiting examples, the methods discussed herein may provide a sweep efficiency which may approach 100%, including greater than 90%, greater than 80%, greater than 50%, or greater than 40%.

In the present disclosure, the carbon dioxide may be introduced to the subterranean formation as a gas, as a carbonated aqueous fluid, or any combination thereof. The carbon dioxide may preferably be introduced as an injected carbon dioxide gas stream. A carbonated aqueous fluid may comprise an aqueous fluid and dissolved carbon dioxide. The aqueous fluid may be obtained from any suitable source such as, but not limited to, fresh water (e.g., stream water, lake water, or municipal treated water), non-potable water such as gray water or industrial process water, sea water, brine, aqueous salt solutions, partially desalinated water, produced water (including brine and other salt water solutions), or any combination thereof.

The carbon dioxide introduced to a subterranean formation in the present disclosure may originate from any suitable source including, for example, a pressurized storage tank or cylinder, a pipeline, the like, or any combination thereof. Carbonated aqueous fluids may be pre-formed and originate from a storage tank, rail car, or pipeline, or the carbon dioxide may be introduced into a suitable aqueous fluid on the fly during introduction to the subterranean formation.

The carbon dioxide may be introduced to the subterranean formation above the hydrocarbon-bearing zone. The carbon dioxide (and subsequently the hydrogen) may be introduced to the subterranean formation through one or more injection wells which may be of any suitable well type. Preferably, the one or more injection wells may include at least one section that is non-vertical and may deviate by at least 30° from vertical, or at least at least 40° from vertical, or at least 50° from vertical, or at least 60° from vertical, or at least 70° from vertical, or at least 80° from vertical, or up to 90° from vertical above the hydrocarbon-bearing zone. That is, the one or more injection wells may include an at least partially horizontal section in particular examples. The at least partially horizontal section may extend over a hydrocarbon-bearing zone in the subterranean formation.

Use of more than one well for introduction of the carbon dioxide to the subterranean formation may be preferred as additional wells may allow for greater sweep efficiency through more precise mobilization of hydrocarbons in a hydrocarbon-bearing zone of the subterranean formation. The hydrocarbon-bearing zone within the subterranean formation may contain a plurality of hydrocarbons of interest for the enhanced hydrocarbon recovery operations described herein. The hydrocarbons may be at least partially mobilized toward one or more production wells. The one or more injection wells used may preferably have at least one outlet located at least partially above the hydrocarbon-bearing zone. Preferably, the at least one outlet may be present in an at least partially horizontal section of the one or more injection wells, wherein the at least partially horizontal section extends above the hydrocarbon-bearing zone in the subterranean formation. The one or more inlet(s) of the one or more production wells may include at least one inlet in the hydrocarbon-bearing zone of the subterranean formation. Additionally, one or more inlets of the one or more production wells may be located at least partially below the hydrocarbon-bearing zone, such as within a water-bearing zone of the subterranean formation. Thus, in some examples, the one or more production wells may comprise at least one inlet in the hydrocarbon-bearing zone and at least one inlet in the water zone of the subterranean formation. Alternately, separate production wells in the hydrocarbon-bearing zone and in the water-bearing zone may be present, each having an inlet localized within each of the corresponding zones. The one or more injection wells or one or more production wells may have attached thereto one or more units of surface equipment for introduction of fluids to or production of hydrocarbons or water from the subterranean formation. Suitable surface equipment for such purposes will be familiar to one having ordinary skill in the art.

In addition to the primary hydrocarbon recovery process described above (the introduction of carbon dioxide), an optional secondary hydrocarbon recovery process may be employed in the integrated methods of the present disclosure. The secondary hydrocarbon recovery process may include an aqueous flooding process. Aqueous flooding may comprise introduction of any suitable aqueous fluid into the subterranean formation for stimulation of the hydrocarbons in the hydrocarbon-bearing zone. Introduction of the aqueous fluid may occur at any suitable pressure and temperature and may occur through the injection well(s) used for carbon dioxide introduction, the production wells for obtaining produced hydrocarbons, or any combination thereof. Suitable equipment for such purposes will be familiar to one having ordinary skill in the art. It should be noted that secondary hydrocarbon recovery processes utilizing aqueous flooding are not necessary for the methods of the present disclosure but may be optionally performed at an operator's discretion. The aqueous fluid, if not produced from the subterranean formation via the one or more production wells, may enter the water-bearing zone of the subterranean formation after production is complete.

As described, the carbon dioxide may promote mobilizations of hydrocarbons in a hydrocarbon-bearing zone of the subterranean formation. The subterranean formation may additionally contain water, with the water being present in a water-bearing zone below the hydrocarbon-bearing zone. The mobilization of hydrocarbons may, in operations utilizing aqueous flooding and/or operations with water extant in the subterranean formation, optionally move a hydrocarbon-water contact region, leading to the production of produced water. As previously described, a hydrocarbon-water contact region may exist between hydrocarbons and extant water (if present) in the subterranean formation and/or may exist between hydrocarbons and aqueous flooding fluid used in the optional secondary hydrocarbon recovery means described above. The produced water, if present, may be removed through one or more wells that may include the one or more production wells used for hydrocarbon production.

Following at least partial depletion of hydrocarbons from the subterranean formation under the promotion of carbon dioxide, hydrogen may be introduced to the subterranean formation for storage and subsequent production at a later time. The level of hydrocarbon depletion needed to make a subterranean formation suitable for hydrogen storage may vary depending on factors including, but not limited to, the geology of the well, the quantity of hydrogen to be stored, the storage time, the like, or any combination thereof. The hydrogen may be introduced through any suitable means including, but not limited to, as an injected gas, a foam, the like, or any combination thereof. The hydrogen may preferably be introduced as injected hydrogen gas. The hydrogen may be introduced through the same injection well(s) used for carbon dioxide introduction, and thus may be introduced to any of the locations where carbon dioxide was previously introduced, including above the hydrocarbon-bearing zone.

The hydrogen may be of any suitable purity including from 50 wt % to 99.9999 wt %, or preferably greater than 95 wt %. Optionally, the hydrogen, in any form, may be blended with additional gases including, but not limited to, nitrogen, air, the like, or any combination thereof. The flow rate during introduction of the hydrogen into the subterranean formation may vary depending on the means used for introduction, and may be, as a nonlimiting example, from less than 1 million m$^3$/day to more than 10 million m$^3$/day for each well.

The carbon dioxide already present in the subterranean formation may be displaced downward by the hydrogen. In this capacity, carbon dioxide may serve as a cushion gas for the storage of hydrogen. Without being bound by theory, the cushion gas may decrease leakage of the hydrogen into the subterranean formation as the cushion gas may be heavier than the hydrogen, thus acting as a base layer and decreasing the permeability of hydrogen. Additionally, the cushion gas may maintain a suitable reservoir pressure in the subterranean formation, which may facilitate subsequent production of the hydrogen. Although the carbon dioxide for use as a cushion gas in hydrogen storage may be introduced to a subterranean formation as part of an enhanced hydrocarbon recovery operation, the carbon dioxide may alternately be introduced to a subterranean formation after hydrocarbon recovery has taken place.

As previously described, water may be present in the subterranean formation, including within a water-bearing zone below the hydrocarbon-bearing zone. The introduction of hydrogen to the subterranean formation may promote production of at least a portion of the water in the subterranean formation as the carbon dioxide is displaced downward. Without being bound by theory, the downward migration of the carbon dioxide may impart pressure to the water to facilitate production thereof.

The methods of the present disclosure may include storage of hydrogen for any suitable length of time, including, but not limited to, 0.1 months to 24 months, 0.1 months to 36 months, or greater than 36 months. Storage times outside the above disclosed ranges are additionally contemplated. The storage time for hydrogen may be affected by factors including, but not limited to, the geology of the subterranean formation (e.g., temperature, permeability, the like), the volume of hydrogen stored, the pressure of hydrogen stored, the storage form (e.g., a gas, a foam, the like), the like, or any combination thereof.

The integrated method of the present disclosure may include production of at least a portion of the hydrogen from the subterranean formation. The production of hydrogen may occur through the one or more injection wells used for introduction of carbon dioxide, the one or more production wells used for production of hydrocarbons and/or water, or any combination thereof. The produced hydrogen may be used for electricity generation, including fuel cell electricity generation. The generated electricity may further promote water electrolysis to produce oxygen and water, whose use may be further integrated in the current processes, as described hereinbelow.

Figure 2B:
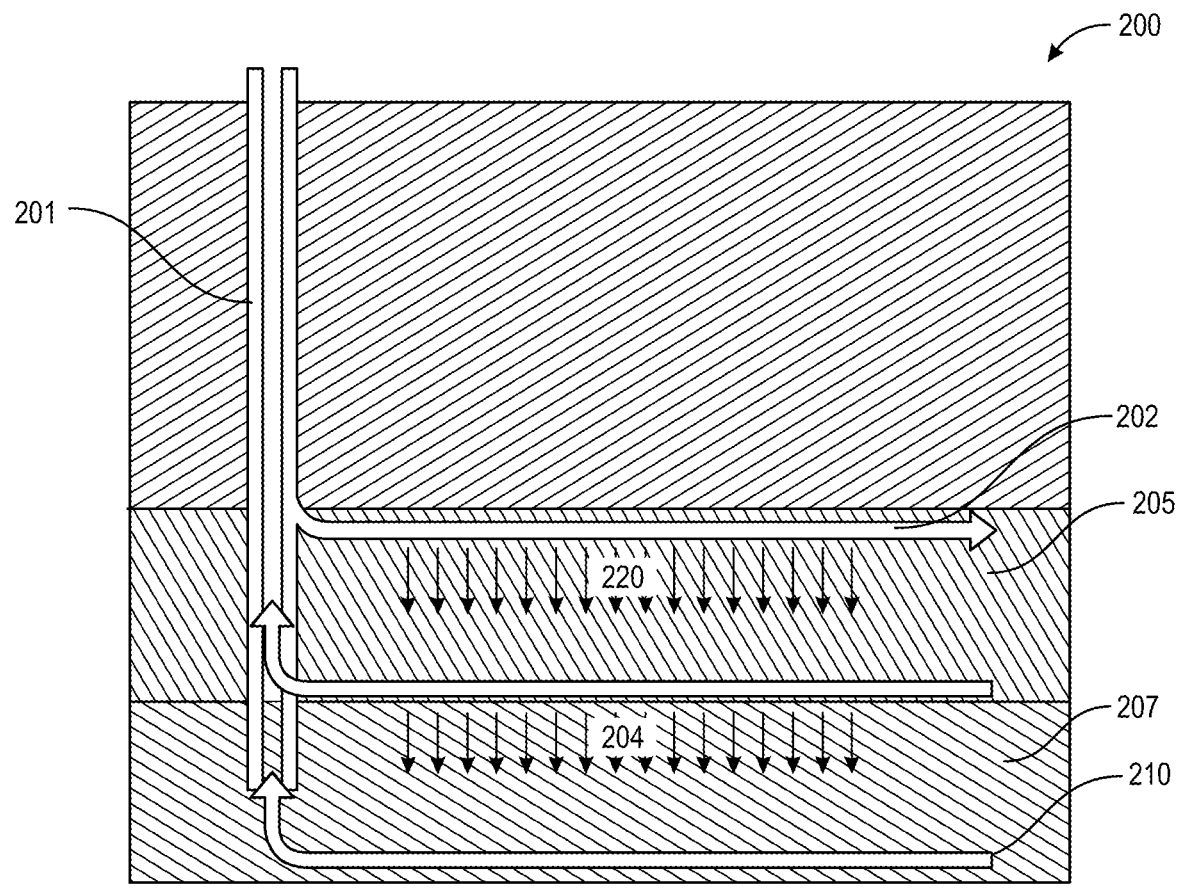

FIGS. 2A and 2B are diagrams showing how a well may introduce carbon dioxide and hydrogen to a subterranean formation in conjunction with enhanced hydrocarbon recovery and hydrogen storage. As shown in FIG. 2A, well 201 has horizontal section 202 penetrating subterranean formation 200. Horizontal section 202 resides over hydrocarbon-bearing zone 205. Carbon dioxide 204 may be introduced above hydrocarbon-bearing zone 205 via horizontal section 202 and percolate downward therein. Hydrocarbons 206 within hydrocarbon-bearing zone 205 may undergo mobilization upon introduction of carbon dioxide 204, migrate to well 201 and undergo subsequent production therefrom. Water 210 may remain within water-bearing zone 207 of subterranean formation 200 during production of hydrocarbons 206.

FIG. 2B shows subterranean formation 200 after production of hydrocarbons 206 has taken place and hydrogen 220 is subsequently introduced thereto. As shown, hydrogen 220 is introduced to hydrocarbon-bearing zone 205 via horizontal section 202. Hydrogen 220 displaces carbon dioxide 204 downward into water-bearing zone 207, which subsequently drives water 210 to well 201 for subsequent production therefrom. As water 210 is displaced, hydrogen 220 may reside within hydrocarbon-bearing zone 205 and overlay carbon dioxide 204 located within water-bearing zone 210. Hydrogen 220 may be stored and subsequently produced from subterranean formation 200 at a desired time without substantially disturbing or producing carbon dioxide 204, which may remain sequestered within subterranean formation 200.

Carbon dioxide and hydrogen may each conventionally be costly to acquire or produce, thus limiting feasibility of these injection stocks for promoting energy storage. The methods described here allow for these injection stocks to be supplied and utilized in a synergistic manner. Additional details facilitating increased synergy between these processes are provided hereinafter.

In some examples, the carbon dioxide introduced to the subterranean formation may be derived from carbon capture during oxy-fuel combustion processes. Oxy-fuel carbon capture comprises burning of a hydrocarbon (including, but not limited to, natural gas, petroleum, methane, ethane, propane, the like, or any combination thereof) with nearly pure oxygen (e.g., from 85 wt % to 99.9999 wt %, or preferably greater than 90 wt %, or most preferably greater than 95 wt % oxygen), rather than burning in air, to produce a product flue gas that primarily includes carbon dioxide suitable for carbon capture. The captured carbon dioxide may be utilized during enhanced hydrocarbon recovery, as discussed above. Methods and systems for implementation of carbon capture during oxy-fuel combustion will be familiar to one having ordinary skill in the art.

Preferably, at least a portion of the hydrocarbon undergoing combustion may originate from the hydrocarbons produced from the subterranean formation. Thus, upon producing hydrocarbons from the subterranean formation and converting the hydrocarbons to carbon dioxide, production of additional hydrocarbons from the subterranean formation may be facilitated. The hydrocarbon undergoing combustion may be natural gas produced from the subterranean formation in a particular example.

As oxy-fuel combustions utilize nearly pure oxygen, the integrated methods of the present disclosure may further generate nearly pure oxygen via electrolysis of water, which is an environmentally friendly process. Hydrogen is co-produced with oxygen during the water electrolysis. Methods and systems for performing of electrolysis of water will be familiar to one having ordinary skill in the art. The electrical energy for performing the water electrolysis may be, at least partially, powered by an energy source with low carbon dioxide emissions or no carbon dioxide emissions (e.g., wind energy, solar energy, nuclear energy, hydropower, the like, or any combination thereof). Energy for performing the water electrolysis may originate from the oxy-fuel combustion process, combustion of the hydrogen produced from the subterranean formation, or any combination thereof. The hydrogen generated through the water electrolysis may then be stored within the subterranean formation or utilized elsewhere.

Figure 3:
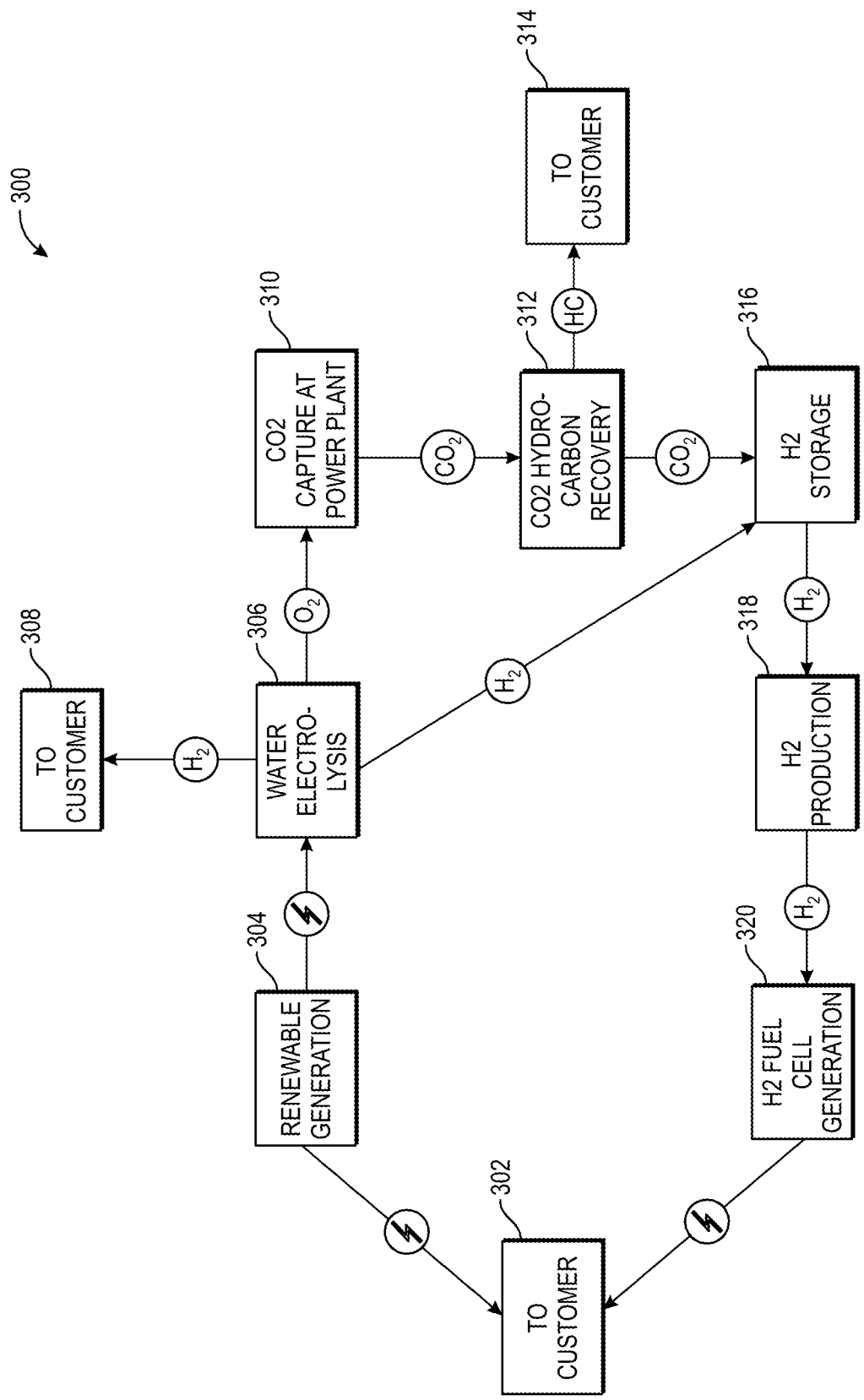
FIG. 3 is a diagram of a non-limiting example flow diagram showing how various aspects of the present disclosure may be integrated with one another.

FIG. 3 is a diagram of a non-limiting example flow diagram showing how various aspects of the present disclosure may be integrated with one another by generating, storing, and utilizing various injection stocks. As shown in FIG. 3, loop system 300 includes renewable generation 304 of electricity, whereby a portion of the electricity may be directed to a customer 302, and/or a portion may be used for electrolysis of water 306 in order to generate hydrogen. The generated hydrogen from electrolysis 306 may be at least partially directed to a customer 308, and/or the generated hydrogen may be later used for hydrogen storage 316. Oxygen from electrolysis 306 may be used for oxy-fuel combustion and subsequent carbon dioxide capture at a power plant 310. The captured carbon dioxide may then subsequently be directed toward carbon dioxide based enhanced hydrocarbon recovery 312. The enhanced hydrocarbon recovery 312 may produce hydrocarbons to be sent to customers 314, and the enhanced hydrocarbon recovery 312 may enable carbon dioxide to remain sequestered in the subterranean formation, allowing for hydrogen storage 316 to take place. Hydrogen production 318 may subsequently occur from hydrogen storage 316, enabling hydrogen fuel cell generation 320 of electricity, to be subsequently provided to a customer 302. The electricity may also be utilized for promoting water electrolysis 306. The system 300 described above allows for continuous supply to a customer 302 of electricity, from either hydrogen production 318 and subsequent fuel cell generation 320 or through renewable generation 304 directly, thus potentially eliminating gaps in electricity supply due to fluctuations in renewable energy availability, while simultaneously producing hydrocarbons and sequestering carbon dioxide.

Embodiments disclosed herein include:

A. A method comprising: introducing carbon dioxide into a subterranean formation via one or more injection wells, the subterranean formation containing hydrocarbons and optionally water; mobilizing at least a portion of the hydrocarbons in a hydrocarbon-bearing zone of the subterranean formation with the carbon dioxide; after mobilization with the carbon dioxide, producing the hydrocarbons from the hydrocarbon-bearing zone of the subterranean formation via one or more production wells; introducing hydrogen to the subterranean formation via the one or more injection wells, the hydrogen displacing the carbon dioxide downward in the subterranean formation; storing the hydrogen in the subterranean formation above the carbon dioxide; and producing at least a portion of the hydrogen from the subterranean formation via the one or more production wells, the one or more injection wells, or any combination thereof.

B. A method comprising: introducing carbon dioxide gas into a subterranean formation via one or more injection wells, the carbon dioxide gas being obtained via carbon capture from an oxy-fuel combustion of a supplied hydrocarbon and a supplied oxygen, and the subterranean formation containing hydrocarbons and optionally water; mobilizing at least a portion of the hydrocarbons in a hydrocarbon-bearing zone of the subterranean formation with the carbon dioxide gas; after mobilization with the carbon dioxide gas, producing the hydrocarbons from the hydrocarbon-bearing zone of the subterranean formation via one or more production wells; introducing hydrogen gas into the subterranean formation via the one or more injection wells, the hydrogen gas displacing the carbon dioxide gas downward in the subterranean formation; storing the hydrogen gas in the subterranean formation above the carbon dioxide gas; and producing at least a portion of the hydrogen gas from the subterranean formation via the one or more production wells, the one or more injection wells, or any combination thereof.

Each of embodiments A and B may have one or more of the following additional elements in any combination:

Element 1: wherein the carbon dioxide is introduced to the subterranean formation above the hydrocarbon-bearing zone.

Element 2: wherein the carbon dioxide is introduced as carbon dioxide gas, a carbonated aqueous fluid, or any combination thereof.

Element 3: wherein the carbon dioxide has a purity of greater than 90 wt %.

Element 4: wherein the carbon dioxide is introduced to the subterranean formation within a flue gas.

Element 5: wherein the hydrogen is introduced to the subterranean formation as a gas.

Element 6: wherein the hydrogen is introduced to the subterranean formation as a foam.

Element 7: wherein the carbon dioxide remains sequestered within the subterranean formation while the hydrogen is being produced.

Element 8: wherein the one or more injection wells comprise an at least partially horizontal section extending above the hydrocarbon-bearing zone.

Element 9: wherein the hydrogen is stored for 0.1 months to 36 months.

Element 10: wherein the carbon dioxide is obtained via carbon capture from an oxy-fuel combustion of a supplied hydrocarbon and a supplied oxygen.

Element 11: wherein the supplied hydrocarbon comprises natural gas.

Element 12: wherein the supplied hydrocarbon comprises at least a portion of the hydrocarbons produced from the hydrocarbon-bearing zone of the subterranean formation.

Element 13: wherein the supplied oxygen is obtained as a byproduct of water electrolysis during generation of hydrogen.

Element 14: wherein at least a portion of the hydrogen generated from the water electrolysis is present in the hydrogen introduced into the subterranean formation.

Element 15: wherein the water electrolysis is powered, at least partially, by an energy source with low carbon dioxide emissions or no carbon dioxide emissions.

Element 16: wherein the energy source is electricity generated using at least a portion of the hydrogen produced from the subterranean formation.

Element 17: further comprising: generating electricity with at least a portion of the hydrogen produced from the subterranean formation.

Element 18: wherein water is present in the subterranean formation in a water-bearing zone below the hydrocarbon-bearing zone, and introducing the hydrogen to the subterranean formation promotes production of at least a portion of the water as the carbon dioxide is displaced downward.

By way of non-limiting example, exemplary combinations applicable to A and B may include, but are not limited to: Element 1 with Element 2, Element 1 with Element 2 and Element 3, Element 1 with Elements 2-4, Element 1 with Elements 2-5, Element 1 with Elements 2-4 and Element 6. Element 1 and Element 6, Element 1 with Elements 2-4 and Elements 6-7, Element 1 with Elements 2-4 and Elements 6-8, Element 1 with Elements 2-4 and Elements 6-9, Element 10 with Element 11, Element 10 with Element 11 and Element 12, Element 10 with Elements 11-13, Element 10 with Elements 11-14, Element 10 with Element 13, Element 10 with Element 13 and Element 14, Element 10 with Element 14, Element 10 with Element 14 and Element 15, Element 10 with Elements 14-16, Element 1 with Element 17, Element 1 with Element 18, Element 8 with Element 11, Element 8 with Element 11 and Element 12, Element 8 with Elements 11-13, Element 8 with Elements 11-14, Element 8 with Elements 11-15, and Element 8 with Element 18.

Additional embodiments disclosed herein include:

Clause 1. A method comprising: introducing carbon dioxide into a subterranean formation via one or more injection wells, the subterranean formation containing hydrocarbons and optionally water; mobilizing at least a portion of the hydrocarbons in a hydrocarbon-bearing zone of the subterranean formation with the carbon dioxide; after mobilization with the carbon dioxide, producing the hydrocarbons from the hydrocarbon-bearing zone of the subterranean formation via one or more production wells; introducing hydrogen to the subterranean formation via the one or more injection wells, the hydrogen displacing the carbon dioxide downward in the subterranean formation; storing the hydrogen in the subterranean formation above the carbon dioxide; and producing at least a portion of the hydrogen from the subterranean formation via the one or more production wells, the one or more injection wells, or any combination thereof.

Clause 2. The method of Clause 1, wherein the carbon dioxide is introduced to the subterranean formation above the hydrocarbon-bearing zone.

Clause 3. The method of Clause 1 or Clause 2, wherein the carbon dioxide is introduced as carbon dioxide gas, a carbonated aqueous fluid, or any combination thereof.

Clause 4. The method of any one of Clauses 1-3, wherein the carbon dioxide has a purity of greater than 90 wt %.

Clause 5. The method of any one of Clauses 1-4, wherein the carbon dioxide is introduced to the subterranean formation within a flue gas.

Clause 6. The method of any one of Clauses 1-5, wherein the hydrogen is introduced to the subterranean formation as a gas.

Clause 7. The method of any one of Clauses 1-5, wherein the hydrogen is introduced to the subterranean formation as a foam.

Clause 8. The method of any one of Clauses 1-7, wherein the carbon dioxide remains sequestered within the subterranean formation while the hydrogen is being produced.

Clause 9. The method of any one of Clauses 1-8, wherein the one or more injection wells comprise an at least partially horizontal section extending above the hydrocarbon-bearing zone.

Clause 10. The method of any one of Clauses 1-9, wherein the hydrogen is stored for 0.1 months to 36 months.

Clause 11. The method of any one of Clauses 1-10, wherein the carbon dioxide is obtained via carbon captured from an oxy-fuel combustion of a supplied hydrocarbon and a supplied oxygen.

Clause 12. The method of Clause 11, wherein the supplied hydrocarbon comprises natural gas.

Clause 13. The method of Clause 11 or Clause 12, wherein the supplied hydrocarbon comprises at least a portion of the hydrocarbons produced from the hydrocarbon-bearing zone of the subterranean formation.

Clause 14. The method of any one of Clauses 11-13, wherein the supplied oxygen is obtained as a byproduct of water electrolysis during generation of hydrogen.

Clause 15. The method of Clause 14, wherein at least a portion of the hydrogen generated from the water electrolysis is present in the hydrogen introduced into the subterranean formation.

Clause 16. The method of Clause 14 or Clause 15, wherein the water electrolysis is powered, at least partially, by an energy source with low carbon dioxide emissions or no carbon dioxide emissions.

Clause 17. The method of Clause 16, wherein the energy source is electricity generated using at least a portion of the hydrogen produced from the subterranean formation.

Clause 18. The method of any one of Clauses 1-16, further comprising: generating electricity with at least a portion of the hydrogen produced from the subterranean formation.

Clause 19. The method of any one of Clauses 1-18, wherein water is present in the subterranean formation in a water-bearing zone below the hydrocarbon-bearing zone, and introducing the hydrogen to the subterranean formation promotes production of at least a portion of the water as the carbon dioxide is displaced downward.

Clause 20. A method comprising: introducing carbon dioxide gas into a subterranean formation via one or more injection wells, the carbon dioxide gas being obtained via carbon capture from an oxy-fuel combustion of a supplied hydrocarbon and a supplied oxygen, and the subterranean formation containing hydrocarbons and optionally water; mobilizing at least a portion of the hydrocarbons in a hydrocarbon-bearing zone of the subterranean formation with the carbon dioxide gas; after mobilization with the carbon dioxide gas, producing the hydrocarbons from the hydrocarbon-bearing zone of the subterranean formation via one or more production wells; introducing hydrogen gas into the subterranean formation via the one or more injection wells, the hydrogen gas displacing the carbon dioxide gas downward in the subterranean formation; storing the hydrogen gas in the subterranean formation above the carbon dioxide gas; and producing at least a portion of the hydrogen gas from the subterranean formation via the one or more production wells, the one or more injection wells, or any combination thereof.

Clause 21. The method of Clause 20, wherein the supplied hydrocarbon comprises natural gas.

Clause 22. The method of Clause 20 or Clause 21, wherein the supplied hydrocarbon comprises at least a portion of the hydrocarbons produced from the hydrocarbon-bearing zone of the subterranean formation.

Clause 23. The method of any one of Clauses 20-22, wherein the supplied oxygen is obtained as a byproduct of water electrolysis during generation of hydrogen.

Clause 24. The method of Clause 23, wherein at least a portion of the hydrogen generated from the water electrolysis is present in the hydrogen introduced into the subterranean formation.

Clause 25. The method of Clause 23 or Clause 24, wherein the water electrolysis is powered, at least partially, with electricity generated using at least a portion of the hydrogen produced from the subterranean formation.

Clause 26. The method of any one of Clauses 20-25, wherein the one or more injection wells comprise an at least partially horizontal section extending above the hydrocarbon-bearing zone.

Clause 27. The method of any one of Clauses 20-26, wherein water is present in the subterranean formation in a water-bearing zone below the hydrocarbon-bearing zone, and introducing the hydrogen to the subterranean formation promotes production of at least a portion of the water as the carbon dioxide is displaced downward.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

What is claimed is:

1. A method comprising:
introducing carbon dioxide into a subterranean formation via one or more injection wells, the subterranean formation containing hydrocarbons and water, wherein the water is present in the subterranean formation in a water-bearing zone below the hydrocarbon-bearing zone;
mobilizing at least a portion of the hydrocarbons in a hydrocarbon-bearing zone of the subterranean formation with the carbon dioxide;
after mobilization with the carbon dioxide, producing the hydrocarbons from the hydrocarbon-bearing zone of the subterranean formation via one or more production wells;
introducing hydrogen to the subterranean formation via the one or more injection wells, the hydrogen displacing the carbon dioxide downward in the subterranean formation and promoting production of at least a portion of the water as the carbon dioxide is displaced downward;
storing the hydrogen in the subterranean formation above the carbon dioxide; and
producing at least a portion of the hydrogen from the subterranean formation via the one or more production wells, the one or more injection wells, or any combination thereof.

2. The method of claim 1, wherein the carbon dioxide is introduced to the subterranean formation above the hydrocarbon-bearing zone.

3. The method of claim 1, wherein the carbon dioxide is introduced as carbon dioxide gas, a carbonated aqueous fluid, or any combination thereof.

4. The method of claim 1, wherein the hydrogen is introduced to the subterranean formation as a gas or as a foam.

5. The method of claim 1, wherein the one or more injection wells comprise an at least partially horizontal section extending above the hydrocarbon-bearing zone.

6. The method of claim 1, wherein the hydrogen is stored for 0.1 months to 36 months.

7. The method of claim 1, further comprising:
generating electricity using a hydrogen fuel cell with at least a portion of the hydrogen produced from the subterranean formation.

8. A method comprising:
introducing carbon dioxide gas into a subterranean formation via one or more injection wells, the carbon dioxide gas being obtained via carbon capture from an oxy-fuel combustion of a supplied hydrocarbon and a supplied oxygen, and the subterranean formation containing hydrocarbons and optionally water;
mobilizing at least a portion of the hydrocarbons in a hydrocarbon-bearing zone of the subterranean formation with the carbon dioxide gas;
after mobilization with the carbon dioxide gas, producing the hydrocarbons from the hydrocarbon-bearing zone of the subterranean formation via one or more production wells;
introducing hydrogen gas into the subterranean formation via the one or more injection wells, the hydrogen gas displacing the carbon dioxide gas downward in the subterranean formation;
storing the hydrogen gas in the subterranean formation above the carbon dioxide gas; and
producing at least a portion of the hydrogen gas from the subterranean formation via the one or more production wells, the one or more injection wells, or any combination thereof,
wherein the supplied hydrocarbon comprises at least a portion of the hydrocarbons produced from the hydrocarbon-bearing zone of the subterranean formation, and/or
wherein the supplied oxygen is obtained as a byproduct of water electrolysis.

9. The method of claim 8, wherein at least a portion of the hydrogen introduced into the subterranean formation is obtained as a byproduct of the water electrolysis.

10. The method of claim 8, wherein the water electrolysis is powered, at least partially, with electricity generated using a hydrogen fuel cell with at least a portion of the hydrogen produced from the subterranean formation.

11. The method of claim 8, further comprising:
generating electricity using a hydrogen fuel cell with at least a portion of the hydrogen produced from the subterranean formation.

12. The method of claim 8, wherein the carbon dioxide gas is introduced to the subterranean formation above the hydrocarbon-bearing zone.

13. The method of claim 8, wherein the hydrogen is introduced to the subterranean formation as a gas or as a foam.

14. The method of claim 8, wherein the one or more injection wells comprise an at least partially horizontal section extending above the hydrocarbon-bearing zone.

15. The method of claim 8, wherein the hydrogen is stored for 0.1 months to 36 months.

16. The method of claim 8, wherein water is present in the subterranean formation in a water-bearing zone below the hydrocarbon-bearing zone, and introducing the hydrogen to the subterranean formation promotes production of at least a portion of the water as the carbon dioxide gas is displaced downward.

17. A method comprising:
introducing carbon dioxide into a subterranean formation via one or more injection wells, the subterranean formation containing hydrocarbons and optionally water;
mobilizing at least a portion of the hydrocarbons in a hydrocarbon-bearing zone of the subterranean formation with the carbon dioxide;
after mobilization with the carbon dioxide, producing the hydrocarbons from the hydrocarbon-bearing zone of the subterranean formation via one or more production wells;
introducing hydrogen to the subterranean formation via the one or more injection wells, the hydrogen displacing the carbon dioxide downward in the subterranean formation;
storing the hydrogen in the subterranean formation above the carbon dioxide;
producing at least a portion of the hydrogen from the subterranean formation via the one or more production wells, the one or more injection wells, or any combination thereof; and
generating electricity using a hydrogen fuel cell with at least a portion of the hydrogen produced from the subterranean formation.

18. The method of claim 17, wherein water is present in the subterranean formation in a water-bearing zone below the hydrocarbon-bearing zone, and introducing the hydrogen to the subterranean formation promotes production of at least a portion of the water as the carbon dioxide gas is displaced downward, and
 wherein the carbon dioxide is obtained via carbon capture from an oxy-fuel combustion of a supplied hydrocarbon and a supplied oxygen, and wherein:
  the supplied hydrocarbon comprises at least a portion of the hydrocarbons produced from the hydrocarbon-bearing zone of the subterranean formation, and/or
  the supplied oxygen is obtained as a byproduct of water electrolysis during generation of hydrogen.

19. The method of claim 17, wherein the carbon dioxide is obtained via carbon capture from an oxy-fuel combustion of a supplied hydrocarbon and a supplied oxygen, and wherein:
 the supplied hydrocarbon comprises at least a portion of the hydrocarbons produced from the hydrocarbon-bearing zone of the subterranean formation, and/or
 the supplied oxygen is obtained as a byproduct of water electrolysis during generation of hydrogen.

* * * * *